April 5, 1927.  
J. R. JOHNSON  
1,623,346  
FEED MECHANISM FOR MACHINE TOOLS  
Filed April 12, 1923  
2 Sheets-Sheet 1
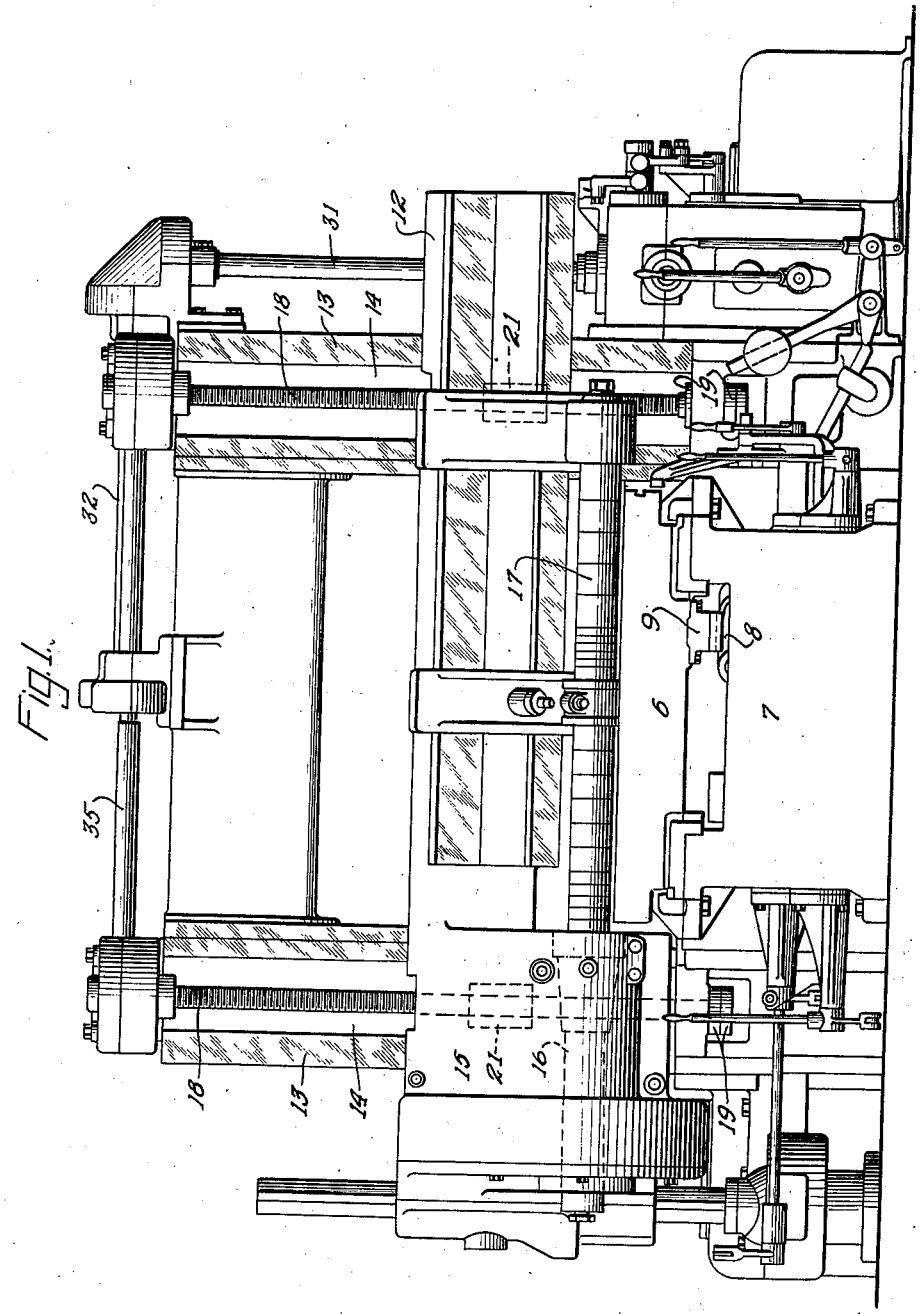
WITNESS.  
Loie E. Conde.
INVENTOR  
John R. Johnson.  
By Wilson & McCanna  
ATTYS.

April 5, 1927.  
J. R. JOHNSON  
1,623,346  
FEED MECHANISM FOR MACHINE TOOLS  
Filed April 12, 1923  
2 Sheets-Sheet 2
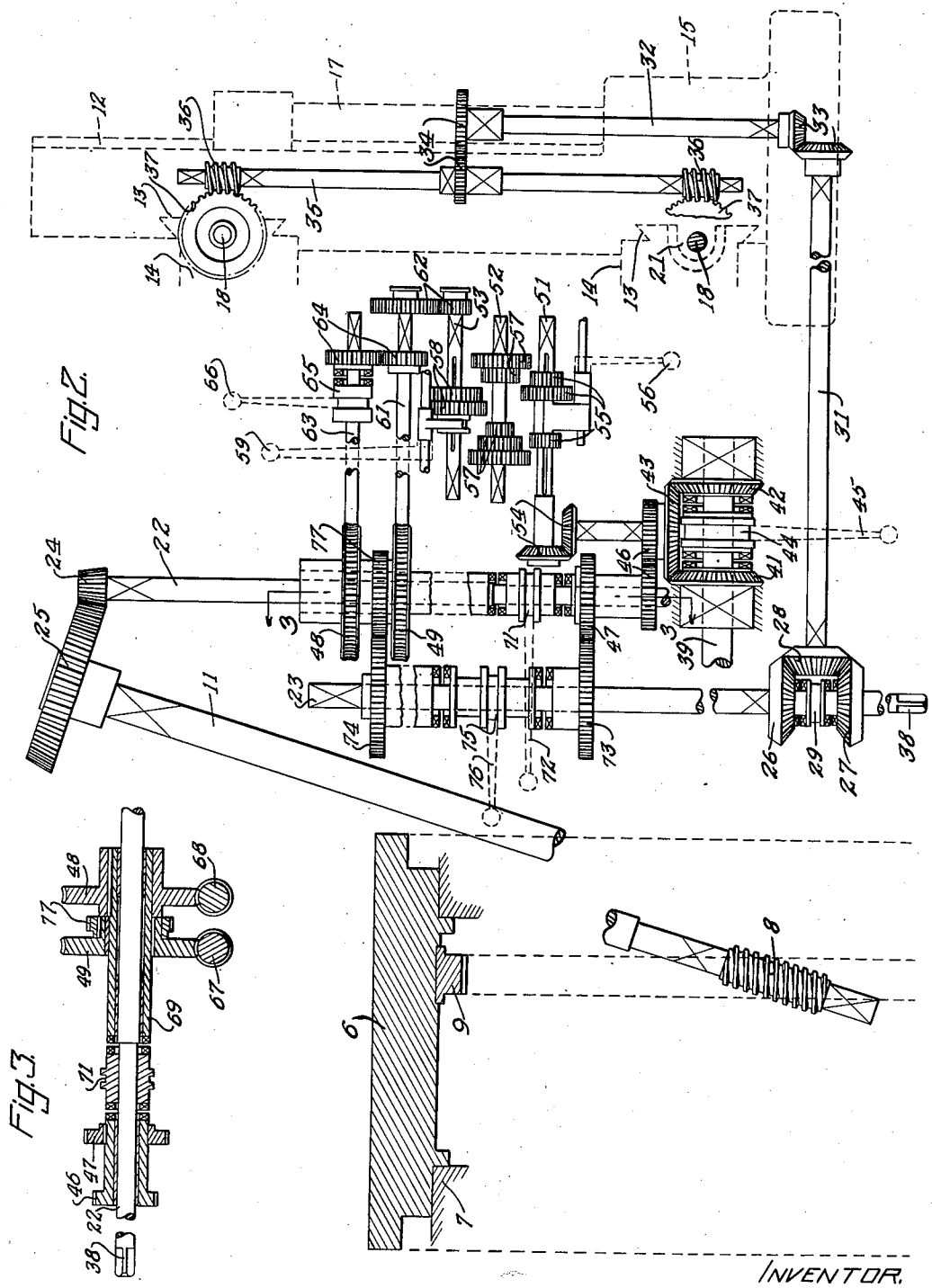
WITNESS.  
Loie Cloude.
INVENTOR.  
John R. Johnson.  
By Wilson & McCanna  
ATTYS.

Patented Apr. 5, 1927.

1,623,346

UNITED STATES PATENT OFFICE.

JOHN R. JOHNSON, OF ROCKFORD, ILLINOIS, ASSIGNOR TO THE INGERSOLL MILLING MACHINE COMPANY, OF ROCKFORD, ILLINOIS, A CORPORATION OF ILLINOIS.

FEED MECHANISM FOR MACHINE TOOLS.

Application filed April 12, 1923. Serial No. 631,509.

This invention relates in general to machine tools, and has more particular reference to mechanism for transmitting feed and rapid traverse movements to one or more elements, such as a work table and a tool spindle carrier. My invention also has reference to feed mechanism of this kind especially adapted for milling machines.

The primary object of my invention is to provide an improved feed mechanism of the character described for the transmission of rapid traverse and feed speeds, or any speeds employed in propelling a work table and a spindle carrier. In this feed mechanism, the speeds are selective and the parts are organized for efficient heavy duty operation.

I have further aimed to provide a feed mechanism of the character described in which special provision is made for positively locking the table and also the spindle carrier against displacement under heavy pressure when the work table is stopped and the feed of the spindle carrier continues, or vice versa.

Another object is to provide a novel feed mechanism having a wide range of speeds and characterized by its few parts in comparison with its functions and the results attained.

Still another object resides in the provision of an improved organization of parts in a machine tool, and especially in a milling machine, which may be economically manufactured and will stand up under the requirements of heavy duty service.

Other objects and attendant advantages will be appreciated by those skilled in this art as the invention becomes better understood by reference to the following description when considered in connection with the accompanying drawings, in which—

Figure 1 is a front elevation of a milling machine embodying my invention;

Fig. 2 is a diagrammatic view of my improved feed mechanism in relation to the driven elements, namely, the work table and the spindle carrier; and Fig. 3 is a section taken substantially on the line 3—3 of Fig. 2.

My invention, while applicable to machine tools in general, is especially adapted for milling machines; and I have in the present instance, shown it in connection with a heavy duty milling machine of the type having a horizontally reciprocable work table and a spindle carried on a vertically adjustable cross rail above the table. Consequently, in the drawings I have shown only such parts of the milling machine as are necessary for an understanding of the present invention. The feed mechanism, however, between the prime driver to the ultimately driven elements, namely, the work table and the cross rail or tool carrier, is fully illustrated by means of a complete gear chart showing the train of drive.

In the present example, the work table 6, mounted for horizontal reciprocation on a bed 7, is adapted to be propelled back and forth by rotation of a helical gear 8 meshing with a rack 9 fixed to the bottom of the table. The helical gear has a relatively high angle lead and is fixed to a propelling shaft 11 adapted to be driven by mechanism which will be latter described.

While this helical gear is desirable as a table propelling medium for reasons well known in this art, it is not, however, a positive lock against heavy table pressure; consequently, means is provided as will be noted hereinafter for performing the desired locking function.

The tool or spindle carrier is at present in the form of a horizontal cross rail 12, vertically slidable on ways 13 on rigid upright side housings 14. This rail carries in its housing 15 at one end a tool spindle indicated in Fig. 1 by dotted lines 16 and adapted to be driven by any suitable means. In the present machine, the spindle drives a cutter arbor 17 mounted on the rail, and one or more cutters may be carried on the arbor for milling work on the table 6. The cross rail is supported and adapted to be moved vertically on its ways by feed screws 18 which are held against axial movement on said housings by collars 19 and work in fixed nuts 21 on the rail. It will be manifest that upon turning the feed screws 18 by mechanism which will be later described, the rail or spindle carrier may be moved vertically at rapid traverse or feed speeds in accordance with the object to be attained.

In the operation of a milling machine of this character, or of any milling machine or other machine tool in which both the work carrier and tool carrier are relatively moved for performing the cutting operation, it is desired to transmit rapid traverse and feed speeds to these carriers either simultaneously or independently, by hand or by power, and to effect these changes in speed by means most appropriate for the needs of the particular work at hand. That is, in the case of high-production work, it is the general practice to control these speed changes automatically, and in cases of special jobs, heavy duty work and contour milling, such as in the milling of locomotive rods, it is the practice to select and control the speeds by hand. The present feed mechanism is adapted for either automatic or hand control; and inasmuch as the method of control is immaterial to the present invention, I have in the following illustration simply shown manually shiftable control means for effecting the changes in speed and the direction and duration of drive.

Referring now to Fig. 2, the two parallel shafts 22 and 23, at present horizontally disposed, connected respectively to the table and carrier as will be presently seen, I have termed "table-feed" and "carrier-feed" shafts. These shafts, together with the gearing for driving them, are inclosed in a suitable housing, the whole organization being known in practice as a gear box. The table-feed shaft 22 is connected directly by means of a bevel pinion 24 to a bevel gear 25 fixed to the table propelling shaft 11. The carrier-feed shaft 23 is connected by means of reversing gears 26—27—28 and a clutch 29 to a vertical shaft 31 (shown in a horizontal plane) which drives an overhead horizontal shaft 32 through bevel gears 33. The shaft 32 drives the rail feed screws 18 through the agency of spur gears 34, an intermediate shaft 35, worms 36 and worm wheels 37 fixed to the feed screws 18. Each shaft 22 and 23 has a squared end 38 for the reception of a hand crank; and it will be manifest that each shaft may be turned by hand for moving its respective carrier through the driving connections just described.

The power-operated means for driving the table and carrier feed shafts will now be described. The prime mover may be any source of power, and for purpose of clarity it may be assumed that the shaft 39 is power operated and constitutes in the present instance the prime mover, which revolves continuously in one direction. A reversing device is provided on this shaft consisting preferably of gears 41 and 42 loose on the shaft and meshing with an intermediate gear 43, and a clutch element 44 splined on said shaft and adapted to be shifted by a control member 45 for connection to either of the gears 41 or 42 for establishing either the forward or the reverse drive. The driven gear 43 of said reversing device or clutch drives through the agency of spur gears 46, a rapid traverse gear 47 loose on the shaft 22. Said gear 43 also drives through the agency of change speed gearing, a table-feed worm wheel or gear 48 and a carrier-feed worm gear 49, mounted to revolve freely about the shaft 22, as will be presently more fully described.

Said change speed gearing may be of any suitable construction; but the train of drive between the gear 43 and the worm for driving the worm gear 48 includes a clutch permitting the table-feed worm to be stopped without interfering with the drive to the carrier-feed worm. In the present example, this gearing provides a comparatively large number of speed changes of feeds for the table and carrier respectively. Such gearing comprises shafts 51, 52 and 53, the first of which is driven by bevel gears 54 from the gear 43 and has splined gears 55 adapted to be shifted by a change speed member 56, into and out of mesh with certain of the gears 57 fixed to the shaft 52. Gears 58 splined on the shaft 53 are adapted to be shifted by a change speed member 59 into and out of mesh with certain of said gears 57. The shaft 53 drives a worm shaft 61 through means of transposing gears 62, which permit still greater speed change. The worm shaft 61 drives a worm shaft 63 through spur gears 64 and a clutch having a shiftable element 65 adapted to be shifted by a control member 66. The shafts 61 and 63 have worms 67 and 68 meshing respectively with the worm gears 49 and 48. From the foregoing, it will be observed that the rapid traverse gear 47 and the table and carrier feed gears 48 and 49 may be simultaneously driven (assuming the clutch 65 engaged) in a forward or reverse direction according to the position of the control member 45, and that by operation of the control member 66 the table-feed gear 48 may be stopped or driven at will.

Referring to Fig. 3, it will be manifest that the table-feed worm gear 48 is fixed to a sleeve 69 loose on the shaft 22, which sleeve may be connected to said shaft by means of a clutch element 71 adapted to be shifted by a control member 72. This clutch element is also adapted for connecting the rapid traverse gear 47 to the shaft 22. It follows that by operation of said control member 72 to connect either the gear 47 or the worm gear 48 to the shaft 22, the latter will be driven at the rapid traverse or feed speed, as the case may be.

The rapid traverse gear 47 is also adapted for driving the carrier-feed shaft 23, and this shaft is adapted to be driven at the feed speed by means of the worm gear 49. In the present instance, this is accomplished by the provision of gears 73 and 74 loose on the shaft 23 and driven by the gears 47 and 49, respectively. Either the rapid traverse gear 73 or the feed gear 74 may be connected to the shaft 23 by means of a clutch element 75 adapted to be shifted by a control member 76. The carrier-feed worm 49 and its companion gear 77, which meshes with the gear 74, are loose on the sleeve 69, as shown plainly in Fig. 3.

The operation is as follows: In the normal or idle position of the machine shown in Fig. 2, all of the clutches are disengaged and only the driving shaft 39 will be revolved. Upon engaging the clutch element 44, power will be transmitted to the rapid traverse gear 47 in a forward or reverse direction as the case may be. Power will also be transmitted to the table and carrier feed worm gears 48 and 49, assuming that the change speed members 56 and 59 and the control member 66 have been shifted to complete the train of drive. While the rapid traverse speed is constant, it will be observed that the worm gears 48 and 49 will be driven at any of a variety of speeds, according to the position of the change speed members, and the worm gear 48 may be stopped or started at will by operation of the control member 66. The work table will be propelled at either the rapid traverse or feed speed by operation of the control member 72, and likewise by operation of the control member 76 the spindle carrier will be traveled vertically at similar speeds. It will be manifest that said control members may be so operated that the rapid traverse speed will be transmitted simultaneously to both the table and spindle carrier, as is desired when bringing the work and cutter into close proximity before starting the cutting operation; likewise, that the feed may be transmitted to both the table and carrier as when it is desired to feed in two directions. On the other hand, either the work table or the spindle carrier may be held stationary and the other may be propelled at either the rapid traverse or feed speeds; or both the table and spindle carrier may be propelled simultaneously but at relatively different speeds. This operation is obviously attainable by proper manipulation of the control members 72 and 76. Further control of the work table is obtained by the control member 66 which permits the table to be started or stopped independently of the drive to the spindle carrier. It will be observed that when said control member 66 disengages the clutch 65, the worm gear 48 and its worm 68, constitute a positive lock for preventing movement of the work table under the influence of heavy feed pressure which may at the time be imparted by feed of the spindle carrier. This locking effect is especially desirable in contour milling or the equivalent, where the cutter is being fed continuously into the work by feed of the spindle carrier, and the work table is moved intermittently by manual operation of the control member 66. This control permits the operator to follow a contour without danger of injury to the machine, which might be caused by jamming of the cutter resulting from freeing the table, but which is prevented by the locking effect of the worm gear 48. It will be manifest in the operation that the direction of drive may be reversed by the control member 45 and that the travel of the spindle carrier may be further reversed by means of the clutch 29. In reference to stopping the spindle drive to the spindle carrier, it will be observed that the latter will always be locked by the feed screws 18 and their respective nuts on the carrier or cross rail.

The foregoing mechanism may be suitably housed in any metal working tool embodying the characteristics described; and it is believed that the illustration in Fig. 2 conveys a clear understanding to one skilled in this art, of the principles and operation of my invention. It should be understood, however, that the invention is in no way limited to the particular number and organization of parts herein disclosed for the reason that this is simply for illustrative purpose merely and exemplifies one working embodiment of the invention as applied to a heavy duty milling machine. Consequently, considerable change might be made in the construction and arrangement of parts without departing from the spirit and scope of the invention as expressed in the appended claims:

I claim:

1. Feed mechanism for machine tools comprising in combination with a work table and a spindle carrier, a prime reversing clutch, a table and a carrier driving shaft in parallel relation, gearing adapted to be continuously driven by said clutch including a rapid traverse and a feed gear on each of said shafts, and means for selectively connecting either the rapid traverse or feed gear of either shafts thereto.

2. Feed mechanism for machine tools comprising a work carrier and a spindle carrier, a propelling shaft for each carrier in parallel relation, a pair of feed gears and a rapid traverse gear loose on one of said propelling shafts, gears loose on the other propelling shaft and in mesh with said rapid traverse gear and one of said feed gears, means for simultaneously driving said rapid traverse and feed gears, and means for selectively connecting said propelling shafts to their respective feed and rapid traverse gears for simultaneously or independently transmitting feed or rapid traverse speeds to said carriers.

3. Feed mechanism for milling machines comprising in combination with a table and a spindle carrier, a prime mover, a table and a carrier feed shaft, table and carrier feed gears loose on the table feed shaft, a table and carrier rapid traverse gear loose on said table-feed shaft, means for driving said gears from said prime mover, gearing connecting the carrier feed shaft to said rapid traverse gear and the carrier feed gear, and clutches for selectively connecting said gears to their respective shafts for simultaneously or independently propelling the table and carrier at either the feed or rapid traverse speeds.

4. Feed mechanism for milling machines comprising in combination with a work table and a spindle carrier, a table and a carrier feed shaft, continuously driven rapid traverse and feed gears loose on one feed shaft and connected with gears loose on the other, and clutches for connecting said gears to their respective shafts for driving them simultaneously or independently at feed or rapid traverse speeds.

5. Feed mechanism for milling machines comprising in combination with the work table and the spindle-carrier, a table and a carrier-feed shaft in parallel relation, a rapid traverse gear and a feed gear loose on the table-feed shaft and on the carrier-feed shaft, means including reversing gears for driving said rapid traverse gears and said feed gears, the drive to the latter including change speed gearing, and clutch mechanism for selectively connecting said rapid traverse and feed gears to said table and carrier-feed shafts, respectively, whereby to drive the latter either simultaneously or independently at rapid traverse or feed speeds.

6. Feed mechanism for machine tools comprising a prime reversing clutch, a rapid traverse gear driven by said clutch, a first and a second driven shaft, the former of which is concentric with said rapid traverse gear, a feed-transmitting worm gear loose on the first driven shaft in mesh with a worm driven by said reversing clutch, means for connecting either said rapid traverse or feed gear to said first driven shaft, means for connecting said second driven shaft to said rapid traverse gear, and gearing driven by said reversing clutch adapted for transmitting feed to the second driven shaft.

7. The combination of a first and a second feed shaft in parallel relation, a driving shaft with and at right angles to the first feed shaft, a reversing connection between said driving shaft and the first feed shaft, a rapid traverse and a feed gear loose on the first feed shaft and driven by said reversing connection, means for connecting either of said gears to the first feed shaft, and means for connecting said rapid traverse gear to the second feed shaft.

8. Feed mechanism for milling machines comprising in combination with a work table and a tool carrier, a table-feed shaft and a carrier-feed shaft, a table and a carrier-feed worm gear and a rapid traverse gear loose on said table-feed shaft, means for driving said gears including a reversing clutch and a clutch in the train between the table worm and said reversing clutch, a clutch for connecting either said rapid traverse or the table-feed gear to the table-feed shaft, and gearing between the carrier-feed shaft and the rapid traverse and the carrier-feed worm gear including a clutch for connecting either the rapid traverse or the carrier-feed worm gear to the carrier-feed shaft.

9. Feed mechanism for milling machines comprising in combination with a work table and a spindle carrier, a helical gear for propelling the table, prime reversing gearing, a double driving train driven by said reversing gearing for propelling the table and carrier respectively, a rapid traverse gear common to both trains, a worm-and-wheel in each train effecting a reduction for the feed and serving to lock the table and carrier respectively when stopped, and a clutch in the table propelling train between its worm and the reversing gearing.

10. Feed mechanism for milling machines comprising in combination with a work table and a spindle carrier, a table and a carrier-feed shaft, a driving connection between the table-feed shaft and the table including a helical gear, a driving connection between the carrier-feed shaft and the carrier including worm-and-wheel gearing, a driving shaft and a reversing device driven thereby, a rapid traverse gear loose on the table-feed shaft and driven by said reversing device, a table and a carrier-feed worm gear loose on the table-feed shaft and driven by said reversing device, the drive to the table-feed worm gearing including a clutch, gears loose on the carrier-feed shaft and in mesh with said rapid traverse gear and carrier-feed worm gear, and clutches for connecting the table and carrier-feed shafts to their respective rapid traverse and feed gears.

11. In a metal working machine, in combination with a work table and a tool carrier, a prime mover, a table-feed shaft and a carrier-feed shaft in parallel relation, a rapid traverse gear on one of said shafts driven by a rapid traverse gear on the other which in turn is driven by the prime mover, means for selectively establishing driving connection between said rapid traverse gears and shafts, feed gearing driven by said prime mover and including change speed gears and a pair of feed gears loose on one of said feed shafts, one of which feed gears is in mesh with a feed-transmitting gear on the other shaft, and means for selectively connecting each shaft to a feed gear thereon.

12. In a metal working machine, in combination, a rapid traverse gear and a feed gear in coaxial relation, a prime drive shaft connected to rotate the rapid traverse gear at a comparatively high speed, a driven shaft coaxial with said gear, a clutch on the driven shaft for selectively connecting either of said gears thereto, and a gearing connection between the rapid traverse gear and the feed gear including a change speed device.

13. In a metal working machine, in combination, a prime drive shaft, a reversing device driven thereby the driven element of which is adapted for transmitting rapid traverse motion in either direction, a driven shaft, a feed element loose on the driven shaft, means for selectively connecting either said rapid traverse or said feed element to the driven shaft, and means driven by said rapid traverse element for driving said feed element.

14. In a metal working machine in combination, with a movable carrier, a rapid traverse and a feed element in coaxial relation, a reversing device for driving the rapid traverse element, a carrier-feed shaft, means for selectively connecting either the rapid traverse or the feed element to said shaft, and means driven by the reversing device for driving the feed element including a change speed device.

15. In a metal working machine, in combination, a work carrier and a tool carrier, a prime mover, a reversing device driven thereby, and driving trains driven by said reversing device comprising rapid traverse gears and change feed gears selectively connectable to the work carrier and tool carrier for transmitting rapid traverse and feed speeds thereto, forward and reverse, and including also a change speed device on the drive-transmitting side of said rapid traverse and feed gears of one of said carriers whereby its travel may be reversed independently of the other.

16. In a metal working machine, in combination, a work table and a tool carrier, a table-feed shaft and a carrier-feed shaft, a rapid traverse and a feed gear selectively connectable to the table-feed shaft, a rapid traverse and a feed gear selectively connectable to the carrier-feed shaft, a prime mover, and driving trains between said prime mover and gears for transmitting the rapid traverse and feed speeds including a change speed device through which feed is transmitted to both feed gears.

17. In a metal working machine, in combination, a work table and a tool carrier, mechanism driven from a prime mover for selectively transmitting variable speeds to the work table and tool carrier including a worm and worm wheel for transmitting feed to the work table and another to the tool carrier, and means whereby the drive to one of the feed worms may be discontinued at will so that it will lock its worm wheel from rotative displacement against back pressure imposed by the feed being transmitted through the other worm and worm wheel, said mechanism including change speed gears in common for transmitting variable feeds to said feed worms.

18. In a metal working machine, in combination, a work table and a tool carrier, mechanism driven from a prime mover for selectively transmitting variable speeds to the work table and tool carrier including a worm and worm wheel for transmitting feed to the work table and another to the tool carrier, and means whereby the drive to one of the feed worms may be discontinued at will so that it will lock its worm wheel from rotative displacement against back pressure imposed by the feed being transmitted through the other worm and worm wheel, said mechanism including a shaft having a rapid-traverse transmitting gear and a feed-transmitting gear, and a change speed gear train driven by said feed-transmitting gear and transmitting variable feeds to said feed worms.

19. In a metal working machine, mechanism for propelling a work table or tool carrier comprising, a prime mover, a reversing device driven by the prime mover, a feed shaft, a rapid traverse gear connectable to the feed shaft at will and driven by said reversing device, and a feed gear connectable to the feed shaft at will and driven by said reversing device.

20. In a metal working machine, mechanism for propelling a work table or tool carrier comprising, a prime mover, a reversing device driven by the prime mover, a feed shaft, a gear co-axial with and driven by the driven element of the reversing device and connectable to the feed shaft for transmitting rapid traverse movement thereto, a feed worm loose on said feed shaft and connectable thereto at will, and change speed gearing for driving said feed worm and being driven by said driven element of the reversing device.

21. In a milling machine of the character described the combination of a horizontally reciprocable work table, a vertically movable cross rail equipped with a tool spindle, a table propelling driving train having a helical gear in mesh with a rack on the table and adapted for propelling the latter at rapid traverse and feed speeds, a cross rail propelling train, rapid traverse mechanism adapted for driving either or both of said propelling trains, and feed mechanism adapted for driving either or both of said propelling trains, said feed mechanism including a common change-speed gearing through which variable feed speeds may be transmitted to both propelling trains, means for disconnecting the feed drive between said gearing and table propelling trains, and means supplemental to said helical gear for automatically locking the work table when said table propelling feed drive is disconnected.

22. In a milling machine of the character described the combination of a horizontally reciprocable work table, a vertically movable cross rail equipped with a tool spindle, a table propelling driving train having a helical gear in mesh with a rack on the table and adapted for propelling the latter at rapid traverse and feed speeds, a cross rail propelling train, rapid traverse mechanism adapted for driving either or both of said propelling trains, and feed mechanism adapted for driving either or both of said propelling trains, said feed mechanism including a common change-speed gearing through which variable feed speeds may be transmitted to both propelling trains, the table propelling train including a worm and worm gear, and means for disconnecting the drive between said worm and the said gearing whereby to automatically lock the work table and permit feed to be transmitted through said feed mechanism to the cross rail while the work table is so locked.

23. In a milling machine, in combination, a reciprocable work table, a movable tool spindle carrier, a driving train adapted to be operated for propelling the table at rapid traverse and feed speeds, a driving train adapted to be operated for propelling the tool spindle carrier at rapid traverse and feed speeds, rapid traverse mechanism, feed mechanism including a common change-speed gearing adapted for transmitting variable speed feeds to both driving trains, control means for selectively connecting either or both driving trains to said rapid traverse mechanism or said feed mechanism, means for disconnecting said feed mechanism from the table propelling train, and means to automatically lock the work table when said table feed is disconnected and while the tool spindle carrier is propelled by said feed mechanism.

24. A milling machine comprising, in combination, a reciprocable work table, a tool spindle carrier, and mechanism for propelling the work table and tool spindle carrier at rapid traverse and variable feed speeds including a propelling train having a driving connection with the table adapted for transmitting both rapid traverse and feed speeds and having also a worm and worm gear for transmitting the feed speeds only and adapted to be stopped for automatically locking the work table, said mechanism including a worm and worm gear adapted for transmitting feed speeds only to the tool spindle carrier, and including also a common change-speed gearing adapted for transmitting variable speed feeds to the both of the said feed worms.

25. In a milling machine, in combination, a reciprocable work table, a cross rail carrying a tool spindle, and mechanism for propelling the work table and cross rail at rapid traverse and feed speeds including a common change-speed gearing adapted for transmitting variable speed feeds to both the work table and cross rail, and means in the table propelling drive supplemental to the immediate means for propelling the table adapted for automatically locking the table while the tool spindle is being propelled by said feed gearing.

26. In a milling machine, in combination, a work table, a tool spindle carrier, a table feed worm gear, a carrier feed worm gear, a common change-speed gear mechanism for driving both work gears, a driving train between the table feed worm gear and the work table, a driving train between the carrier feed worm wheel and the tool spindle carrier, means for connecting and disconnecting said driving trains at will, and means for disconnecting the table feed worm gear from said change-speed mechanism independently of the carrier feed worm gear whereby to automatically lock the work table while feed movement is being transmitted through said change-speed mechanism to the tool spindle carrier.

27. In a milling machine, in combination, a work table, a tool spindle carrier, a table feed worm gear, a carrier feed worm gear, a common change-speed mechanism for driving both said worm gears, rapid traverse gearing, table propelling means adapted to be selectively connected to said table feed worm gear and rapid traverse gearing, spindle carrier propelling means adapted to be selectively connected to said carrier feed worm gear, and means whereby said table feed worm gear may be disconnected from said change-speed mechanism to effect automatic locking of the work table independently of the propelling of the tool spindle carrier by said change-speed gearing.

28. In a milling machine, in combination, a work table, a tool spindle carrier, a table propelling train including a shaft connected to the work table through the agency of a helical gear and rack and adapted to be operated for propelling the table at rapid traverse and feed speeds, a spindle carrier propelling train, and mechanism including a common change-speed gear train through which power is transmitted to both said table propelling shaft and said spindle carrier propelling train including a worm gear in the table propelling train between said change-speed gearing and the table propelling shaft adapted to be stopped independently of said change-speed gearing to automatically lock the work table while said gearing is propelling the tool spindle carrier.

29. In a milling machine, in combination, a work table, a tool spindle carrier, separate work table and spindle carrier propelling trains, the work table propelling train including a helical gear connected to a rack on the work table and adapted for propelling the table at rapid traverse and feed speeds, a common change-speed gear mechanism adapted for transmitting variable speed feeds to the respectively driving trains, a common rapid traverse gearing for transmitting rapid traverse speed to said respective driving trains, and means for selectively connecting said driving trains to said feed mechanism and rapid traverse gearing.

30. In a milling machine, in combination, a work table, a tool spindle carrier, separate work table and spindle carrier propelling trains, the work table propelling train including a helical gear connected to a rack on the work table and adapted for propelling the table at rapid traverse and feed speeds, a common change-speed gear mechanism adapted for transmitting variable speed feeds to the respectively driving trains, a common rapid traverse gearing for transmitting rapid traverse speed to said respective driving trains, means for selectively connecting said driving trains to said feed mechanism and rapid traverse gearing, and means in the table propelling train for stopping the feed and thereby automatically locking the work table while the spindle carrier is being propelled at a feed speed through said change-speed gear mechanism.

31. In a milling machine, in combination, a work table, a tool spindle carrier, a table feed worm gear and a carrier feed worm gear in co-axial relation, a common change-speed gear mechanism for transmitting variable speed feeds to said worm gears, a clutch whereby the table feed worm gear may be disconnected from said mechanism, a driving train between the table feed worm gear and the work table including a propelling shaft having a helical gear in mesh with a rack on the work table, and a driving train between the carrier feed worm gear and the spindle carrier.

32. In a milling machine, in combination, a work table, a tool spindle carrier, a table feed worm gear and a carrier feed worm gear in co-axial relation, a common change-speed gear mechanism for transmitting variable speed feeds to said worm gears, a clutch whereby the table feed worm gear may be disconnected from said mechanism, a driving train between the table feed worm gear and the work table including a propelling shaft having a helical gear in mesh with a rack on the work table, a driving train between the carrier feed worm gear and the spindle carrier, rapid traverse gearing, and means for selectively connecting the work table propelling train to either its table feed worm gear or said rapid traverse gearing and for connecting the spindle carrier propelling train to either its carrier feed worm gear or said rapid traverse gearing.

33. In a milling machine, in combination, a work table, a tool spindle carrier, a table feed worm gear and a carrier feed worm gear in co-axial relation, a common change-speed gear mechanism for transmitting variable speed feeds to said worm gears, a clutch whereby the table feed worm gear may be disconnected from said mechanism, a driving train between the table feed worm gear and the work table including a propelling shaft having a helical gear in mesh with a rack on the work table, a driving train between the carrier feed worm gear and the spindle carrier, rapid traverse gearing, means for selectively connecting the work table propelling train to either its table feed worm gear or said rapid traverse gearing and for connecting the spindle carrier propelling train to either its carrier feed worm gear or said rapid traverse gearing, and a prime mover for driving both said change-speed gear mechanism and said rapid traverse gearing.

34. In a milling machine, in combination, a work table, a tool spindle carrier, a separate driving train for propelling the work table and tool spindle carrier, the work table propelling train including a helical gear meshing with a rack on the table and adapted to be operated for propelling it at feed and rapid traverse speeds, a table feed worm gear, a carrier feed worm gear, a common change-speed gear mechanism adapted for driving both worm gears for transmitting variable speed feeds, means for transmitting rapid traverse speed, means for selectively connecting the table propelling driving train and the carrier propelling driving train to their respective feed worm gears and to the rapid traverse means, a reversing device for reversing the direction of the table propelling train, and a reversing device for reversing the direction of the carrier propelling train independently of the first mentioned reversing device.

35. In a milling machine, in combination, a work table, a tool spindle carrier, a table feed shaft, a carrier feed shaft, a table feed worm gear, a carrier feed worm gear, a common change-speed feed gearing for driving both worm gears, a common rapid traverse means for driving both table and carrier feed shafts, and control means for selectively connecting the table feed worm gear and the rapid traverse means to the table feed shaft and for selectively connecting the carrier feed worm gear and the rapid traverse means to the carrier feed shaft.

36. In a milling machine, in combination, a work table, a tool spindle carrier, a table feed shaft, a carrier feed shaft, a table feed worm gear, a carrier feed worm gear, a common change-speed feed gearing for driving both worm gears, a common rapid traverse means for driving both table and carrier feed shafts, control means for selectively connecting the table feed worm gear and the rapid traverse means to the table feed shaft and for selectively connecting the carrier feed worm gear and the rapid traverse means to the carrier feed shaft, and means for disconnecting the table feed worm gear from said change-speed feed gearing independently of the carrier feed worm gear to automatically lock the work table while feed is being transmitted through said change-speed feed gearing to the spindle carrier.

37. In a milling machine, in combination, a work table, a tool spindle carrier, table and carrier propelling mechanism including a worm and worm gear for the table and another for the carrier with the worm gears in co-axial relation, a common change-speed gear mechanism for transmitting variable speed feeds to both worm gears, and means for disconnecting the table worm gear from said gearing whereby to automatically lock the work table through its propelling worm and worm gear while feed is transmitted by said gearing through the other worm and worm gear to the tool spindle carrier.

JOHN R. JOHNSON.